(12) United States Patent
Shen

(10) Patent No.: US 8,135,073 B2
(45) Date of Patent: Mar. 13, 2012

(54) ENHANCING VIDEO IMAGES DEPENDING ON PRIOR IMAGE ENHANCEMENTS

(75) Inventor: Richard Chi-Te Shen, Leonia, NJ (US)

(73) Assignee: Trident Microsystems (Far East) Ltd, Grand Cayman (KY)

( * ) Notice: Subject to any disclaimer, the term of this patent is extended or adjusted under 35 U.S.C. 154(b) by 1799 days.

(21) Appl. No.: 10/537,889

(22) PCT Filed: Dec. 12, 2003

(86) PCT No.: PCT/IB03/05966
§ 371 (c)(1),
(2), (4) Date: Jun. 7, 2005

(87) PCT Pub. No.: WO2004/057535
PCT Pub. Date: Jul. 8, 2004

(65) Prior Publication Data
US 2006/0153287 A1    Jul. 13, 2006

Related U.S. Application Data

(60) Provisional application No. 60/435,237, filed on Dec. 20, 2002.

(51) Int. Cl.
*H04N 7/18* (2006.01)
(52) U.S. Cl. .......... 375/240.25; 375/240.13; 375/240.14
(58) Field of Classification Search . 375/240.01–240.29
See application file for complete search history.

(56) References Cited

U.S. PATENT DOCUMENTS

| | | | |
|---|---|---|---|
| 5,862,254 A | 1/1999 | Kim et al. | |
| 6,157,396 A | 12/2000 | Margulis et al. | |
| 6,259,472 B1 | 7/2001 | Park | |
| 6,384,248 B1 | 5/2002 | Pearlstein et al. | |
| 6,385,248 B1 | 5/2002 | Pearlstein et al. | |
| 6,594,790 B1 | 7/2003 | Sato et al. | |
| 7,609,767 B2 * | 10/2009 | Srinivasan et al. | 375/240.25 |
| 2003/0206591 A1 | 11/2003 | Yang et al. | |

FOREIGN PATENT DOCUMENTS

CN    1193399 A    9/1998

(Continued)

OTHER PUBLICATIONS

PCT/IB2003/005966 International Search Report dated Apr. 6, 2004.

(Continued)

*Primary Examiner* — Andy S. Rao
(74) *Attorney, Agent, or Firm* — DLA Piper LLP (US)

(57) ABSTRACT

A video stream containing encoded frame-based video information includes a first frame and a second frame. The encoding of the second frame depends on the encoding of the first frame. The encoding includes motion vectors indicating differences in positions between regions of the second frame and corresponding regions of the first frame, the motion vectors defining the correspondence between regions of the second frame and regions of the first frame. The first frame is decoded and a re-mapping strategy for video enhancement of the decoded first frame is determined using a region-based analysis. Regions of the decoded first frame are re-mapped according to the determined video enhancement re-mapping strategy for the first frame so as to enhance the first frame. The motion vectors for the second frame are recovered from the video stream and the second frame is decoded.

21 Claims, 3 Drawing Sheets

FOREIGN PATENT DOCUMENTS

| | | |
|---|---|---|
| JP | 2001-69514 | 3/2001 |
| JP | 2003348488 A | 5/2003 |
| WO | WO9749064 A1 | 12/1997 |
| WO | WO2004/057535 | 7/2004 |

OTHER PUBLICATIONS

Atzori L. et al., "Post-processing for real-time quality enhancement of MPEG-coded video sequences", Multimedia and Expo, 2000. ICME 2000. 2000 IEEE International Conference on New York, NY, USA Jul. 30 Jul.-Aug. 2, 2000, Piscataway, NJ, USA, IEEE, US, Jul. 30, 2000, pp. 975-978.

Boyce, J. et al., "Low-Cost all format ATV Decoding with Improved Quality", SMPTE Advanced Motion Imaging Conference, XX, XX, Feb. 2, 1996, pp. 45-51.

Prosecution of counterpart Japanese application No. 2004-561846 (JP2006-511160A), including Japanese Office Action issued May 21, 2010 (w/English translation), Response filed Aug. 3, 2010 (English translation unavailable), as well Decision of Final Rejection issued on Aug. 27, 2010 (English translation unavailable), 11 pages total.

* cited by examiner

ENHANCING VIDEO IMAGES DEPENDING ON PRIOR IMAGE ENHANCEMENTS

CROSS-REFERENCE TO RELATED APPLICATION(S)

This 371 application claims the priority benefits of PCT International Application PCT/IB03/05966, filed Dec. 12, 2003, and claims the benefit of Provisional Application No. 60/435,237, filed Dec. 20, 2002.

The invention relates to the field of video image processing and more specifically to enhancing subsequent images of a video stream in which frames are encoded based on previous frames using prediction and motion estimation.

Those skilled in the art are directed to U.S. Pat. No. 6,259,472 and U.S. Pat. No. 5,862,254 which describe enhancing of video images. These citations are hereby incorporated herein in whole by reference.

In the invention herein, a video stream containing encoded frame based video information is received. The video stream includes an encoded first frame and an encoded second frame. The encoding of the second frame depends on the encoding of the first frame. More specifically, the encoding of the second frame includes motion vectors indicating differences in positions between regions of the second frame and corresponding regions of the first frame, the motion vectors define the correspondence between regions of the second frame and regions of the first frame.

The first frame is decoded and a re-mapping strategy for video enhancement of the decoded first frame is determined using a region-based analysis. Regions of the decoded first frame are re-mapped according to the determined video enhancement re-mapping strategy for the first frame so as to enhance the first frame.

The motion vectors for the second frame are recovered from the video stream and the second frame is decoded. Then regions of the second frame, that correspond to regions of the first frame, are re-mapped using the video enhancing, region-based, re-mapping strategy for the regions of the first frame so as to enhance the second frame.

The reuse of the video enhancing re-mapping strategy of previous frames for subsequent frames greatly reduces the processing required for providing video enhancements.

In a further aspect of the invention one or more regions of the second frame are selected depending on whether a similarity criteria is met for a similarity between the regions of the second frame and corresponding regions of the first frame. Then the re-mapping of the regions of the second frame based on the video enhancing region-based re-mapping strategy for the first frame is only performed for the selected regions of the second frame.

Limiting the reuse of the video enhancing re-mapping strategy of previous frames to only regions of the subsequent frames that are sufficiently similar to the previous frame, increases the likelihood that the subsequent frame will be enhanced.

A set top box using the decoder of the invention provides enhanced video pictures with minimal additional hardware costs. Using the decoder of the invention for a video disc player allows higher compression of groups of pictures on the video disc with the same perceived quality. A television that uses the decoder of the invention can display higher quality video pictures or utilize a more highly compressed video signal while providing the same quality as a less compressed signal.

Additional aspects and advantages of the invention will become readily apparent to those skilled in the art from the detailed description below with reference to the following drawings.

In the following descriptions of the drawings, the same labels in different figures indicate similar devices. For convenience, such devices will only be described in detail in relation to the earliest described figure in which they appear.

Figure 1:
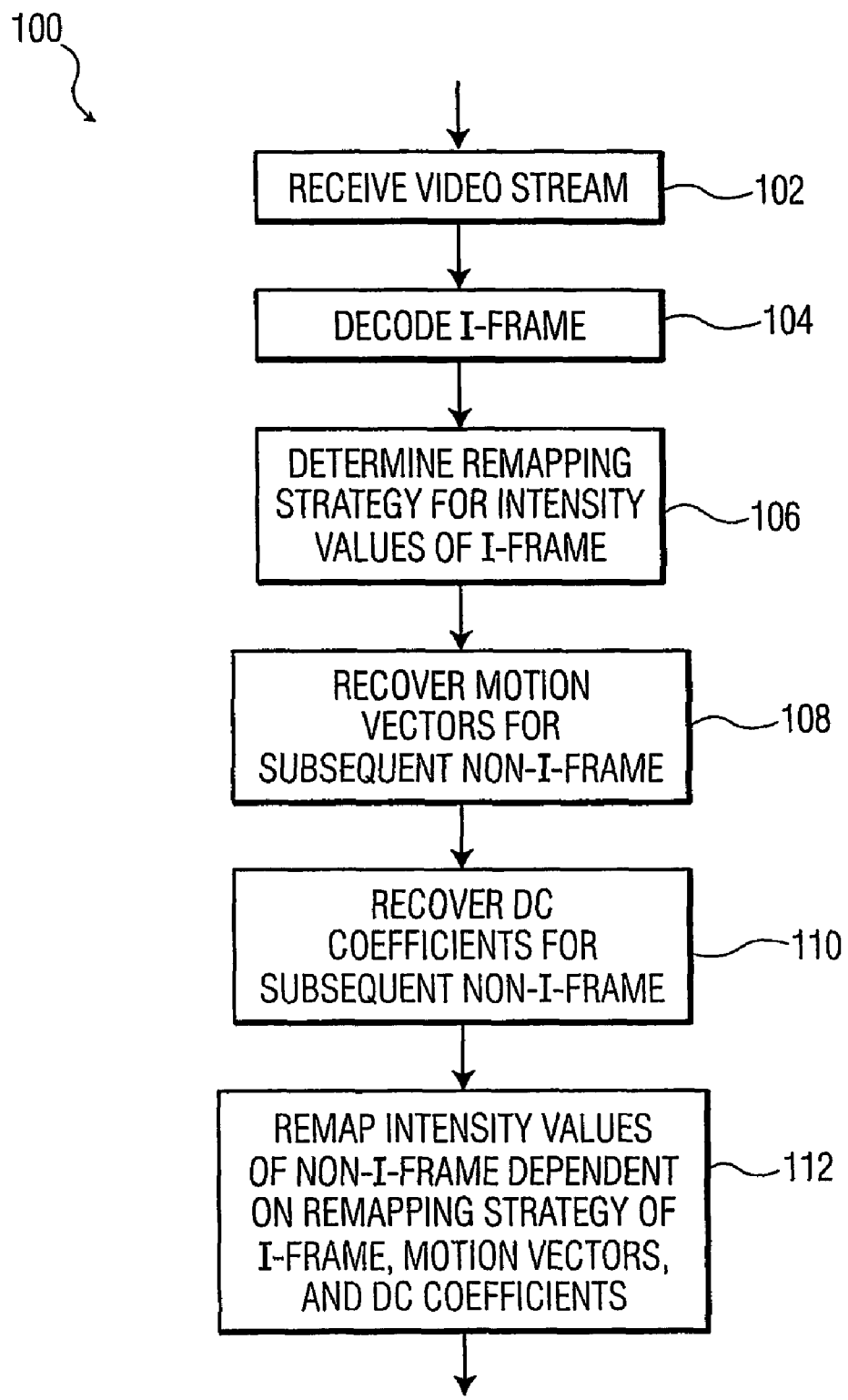
FIG. 1 illustrates an example method of the invention for region-based enhancing of subsequent video images.

FIG. 1 shows a specific embodiment 100 of the method of the invention. In 102 a video stream is received. The stream contains encoded information for groups of pictures (GOP), the first picture in the GOP is an intra-coded frame (I-frame) and subsequent pictures in the GOP are non-I-frames. The decoding of the subsequent non-I-frames depends on the coding of the I-frame. The video stream may be, for example, an MPEG II stream of packets, in which case, the non-I-frames may be, for example, predicted frames (P-frames), and/or bi-directional frames (B-frames). However, any other type of GOP based video stream may be used as long as it contains subsequent frames that are encoded based on previous frames. In 104, the I-frame is decoded. Decoding of I-frames is well known in the art.

In 106, a re-mapping strategy for re-mapping the intensity values to adjust the contrast is determined so as to enhance the decoded I-frame. The re-mapping strategy may use a region-based intensity analysis. Methods of determining re-mapping strategies for regions of decoded frames using such analysis are well known, and those skilled in the art are directed to U.S. Pat. No. 6,259,472 and U.S. Pat. No. 5,862,254 which disclose such re-mapping of intensity values. In 108, the intensity values of the decoded I-frame are re-mapped according to the determined re-mapping strategy.

In 108, motion vectors for the subsequent non-I-frame are recovered from the video stream as is well known in the art. Generally, motion vectors are differences in the positions between regions in an I-frame and corresponding regions in a non-I-frame that is coded dependent on the I-frame. The regions may be regions of similar intensity or regions of similar texture or any other predefined similarity between frames may be used to define regions.

In 110, DC coefficients for the subsequent non-I-frame are recovered from the video stream as is well known in the art. Generally, the DC coefficients are the differences between the values of the image blocks of the I-frame and the predicted values of corresponding image blocks of the non-I-frame, after motion estimation. Motion estimation is generally, the re-mapping of the regions depending on the motion vectors during decoding.

In 112, the intensity values in the regions of the non-I-frame are re-mapped depending on the re-mapping strategy of corresponding regions of the I-frame so as to adjust the contrast to enhance the non-I-frame. The correspondence between the regions is determined from the motion vectors.

If a region of the subsequent non-I-frame is more similar to the corresponding region of the I-frame (on which the decoding of the non-I-frame depends), than it is more likely that using the re-mapping strategy, developed for re-mapping the intensity values of the corresponding I-frame region, for re-mapping the intensity values for the non-I-frame region, will enhance the non-I-frame. On the other hand, if the region of the non-I-frame is substantially different than the corresponding region of the I-frame, then using the intensity value re-mapping strategy for the corresponding region of the I-frame, for re-mapping the intensity values of the region of the non-I-frame, is not likely to enhance the non-I-frame, and in fact may even reduce the quality of the non-I-frame.

Using the strategy for re-mapping the I-frame for enhanced contrast for re-mapping subsequent frames greatly reduces the overhead required for contrast enhancement. Generally any region-based video processing for improving the quality of an I-frame can be applied to corresponding regions of subsequent non-I-frames in a similar manner.

The re-mapping of the intensity values of the non-I-frame may also depend on the DC coefficients of the blocks of the regions of the non-I-frame on which the decoding of the non-I-frame depends. Generally, small values of the DC coefficients for a region indicate that the region is likely to be similar to the corresponding region in the I-frame after motion compensation. Thus, when its determined the DC coefficients are relatively large, then the re-mapping strategy for the intensity values of the I-frame are not used to re-map the intensity values of the non-I-frame. This can be determined by using a threshold for the DC coefficients, which can be a constant predetermined value or a variable value calculated for each region, and then using the I-frame re-mapping strategy to re-map the intensity values for a region only when the value of the DC coefficients are below the threshold. Those skilled in the art can easily determine either a standard predetermined DC coefficient threshold for regions in a frame, or a method to calculate a DC coefficient thresholds for each region in a frame, that can be used to enhance the frames. A useful DC coefficient threshold can be determined, for example, by a simple trial and error process of comparing frames in which different thresholds or threshold calculation methods have been applied.

In addition, the re-mapping of the intensity values of the non-I-frame may also depend on the properties of the motion vectors. As discussed above, the motion vectors are used to identify regions of the subsequent non-I-frame, that correspond to regions of the I-frame, in a process called motion compensation. However, in addition to their use in motion compensation, the properties of the motion vectors can also be used to determine the likelihood that the regions of the non-I-frame are similar to the corresponding regions of the I-frame.

Each motion vector has a value and a direction. Relationships between the motion vectors of neighboring regions include differences in values and differences in direction called orthogonality. Generally, for a non-I-frame, small values for the motion vector for a region, small differences between motion vector values of a region and its neighboring regions, and small differences between motion vector directions of a region and its neighboring regions, each indicate that the region is more likely to be similar to the corresponding I-frame region.

Generally, a small value of the motion vector for a region of the non-I-frame indicates that the region is more likely to be similar to the corresponding region in the I-frame on which its decoding depends. When its determined the motion vector values are relatively large, then the re-mapping strategy for the intensity values of the I-frame is not used to re-map the intensity values of the non-I-frame. This can be determined by using a threshold for motion vector values, which can be a constant predetermined value or a variable value calculated for each region. Then the I-frame re-mapping strategy is used to re-map the intensity values for regions only if the values of the respective motion vectors for those regions are below the threshold. Again, those skilled in the art can easily determine either a standard predetermined motion vector value threshold for regions in the non-I-frame, or a method to calculate a motion vector value threshold for regions in a non-I-frame, that can be used to enhance the non-I-frames. A useful motion vector value threshold can be determined, for example, by a simple trial and error process of comparing non-I-frames in which different thresholds or threshold calculation methods have been applied.

Also, consistency in the values of the motion vectors between a region of the non-I-frame and its neighboring regions in the non-I-frame indicates that the region is more likely to be similar to the corresponding region in the I-frame on which the decoding of the non-I-frame depends. When its determined that the motion vector values of neighboring regions are substantially inconsistent or dissimilar to the motion vector values in the region, then the re-mapping strategy for the intensity values of the I-frame is not used to re-map the intensity values of the non-I-frame. This determination can be done, for example, by determining the average difference between the values of motion vectors for regions and the values of the motion vectors of neighboring regions, and then comparing the average differences in value to a value consistency threshold. The value consistency threshold can be a constant predetermined value or a variable value calculated for each region. Then the I-frame re-mapping strategy is used to re-map the intensity values for regions only if the average differences in the values of the motion vectors are below the value consistency threshold. Similarly squares of the value differences or other combinations of the value differences or other well know statistical approaches could be used to determine value consistency. Again, those skilled in the art can easily determine either a standard predetermined value consistency threshold for regions in a frame, or a method to calculate value consistency thresholds for regions in a non-I-frame, that can be used to enhance the non-I-frames. A useful value consistency threshold may be determined, for example, by a simple trial and error process of comparing different non-I-frames in which different respective value consistency thresholds or threshold calculation methods have been applied.

Also, consistency of motion vector direction between a region and neighboring regions in the non-I-frame, indicate that the non-I-frame region is more likely be similar to the corresponding regions in the I-frame on which its decoding depends. When its determined that the motion vector direction of neighboring regions are substantially inconsistent or dissimilar to the motion vector direction of the region, then the re-mapping strategy for the intensity values of the I-frame for the region is not used to re-map the intensity values of the non-I-frame region. This can be determined, for example, by determining the average difference between the directions of motion vectors for regions and the directions of the motion vectors of neighboring regions, and then comparing the average differences in direction to a direction consistency threshold. The direction consistency threshold can be a constant predetermined value or a variable value calculated for each region. Then the I-frame re-mapping strategy is used to re-map the intensity values for regions only if the average differences in the values of the motion vectors are below the direction consistency threshold. Similarly squares of the direction differences or other combinations of the direction differences or other well know statistical approaches could be used. Again, those skilled in the art can easily determine either a predetermined value for the direction consistency threshold or a method to calculate such a threshold for each region in a frame, that can be used to enhance the non-I-frames. A useful direction consistency threshold or method to calculate such a threshold can easily be determined, for example, by a simple trial and error process of comparing frames in which different thresholds or threshold calculation methods are applied.

Multiple indications of similarity may be applied to determine whether to apply the re-mapping strategy of an I-frame to a subsequent non-I-frame whose decoding depends on the I-frame. Those skilled in the art will know how to develop functions that combine multiple indications of similarity to determine whether to apply the I-frame re-mapping strategy to the non-I-frame. For example, they can use the I-frame contrast re-mapping strategy only when all the indications of similarity meet respective threshold requirements. Alternatively or in addition, they can determine the differences or relative differences between the indications of similarity and their respective thresholds and only apply the I-frame contrast re-mapping strategy to the non-I-frame when the total of the differences or relative differences (or square of the differences or relative differences) is below a further threshold.

Those skilled in the art will know how to apply this process to more complex dependencies between frames such as subsequent non-I-frames, whose decoding is dependent on previous non-I-frames, whose decoding is dependent on I-frames. They can, for example, just apply the contrast enhancing re-mapping strategy of the I-frame to such subsequent non-I-frames. Alternatively, they can, for example, develop a second contrast enhancing re-mapping strategy for the previous non-I-frame, which can be applied to the subsequent non-I-frame.

The decoding of a non-I-frame may be dependent on multiple other frames. Those skilled in the art will know how to develop a function that applies the contrast enhancing re-mapping strategy of the multiple frames to the non-I-frame.

Figure 2:
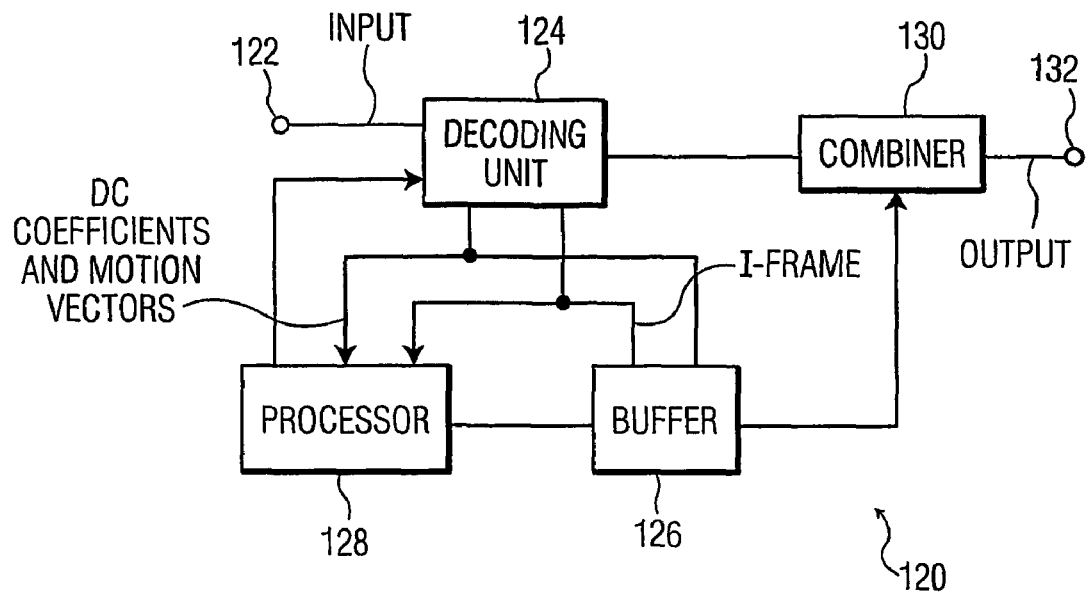
FIG. 2 shows portions of an example decoder of the invention for providing region-based enhanced subsequent video images.

FIG. 2 illustrates the basic components of a video decoder 120 of the invention.

A video stream of packets containing a group of pictures (GOP) is received at an input 122, the first picture in the GOP is an I-frame and a subsequent picture in the GOP is a non-I-frame. The video stream may be an MPEG stream as described above.

A decoding unit 124 decodes the frames of the GOP. The decoding unit provides the decoded I-frame to a buffer 126, to a processing unit 128.

Processor 128 uses a region-based intensity analysis to determine a strategy to re-map intensity values to change contrast to enhance the I-frame image, and re-maps the intensity values of the I-frame in buffer 126 using the re-mapping strategy. The buffer then passes the contrast enhanced I-frame to output 132 through summation unit 130.

The decoding unit recovers the DC coefficients and the motion vectors for the subsequent non-I-frames of the GOP and supplies them to the buffer 126 and processor 128. Processor 128 re-maps the original I-frame and the contrast enhanced I-frame according to the motion vectors.

The decoding unit provides the decoded differences between the I-frame and the subsequent non-I-frames to the summation unit 130. Depending on a selection criteria, for each region, the buffer 126 supplies either the motion vector re-mapped I-frame or motion vector re-mapped contrast enhanced I-frame to summation unit 130. The summation unit combines the decoded differences and the re-mapped enhanced I-frame together to produce the decoded subsequent non-I-frame.

The selection criteria in this specific example for a region is as follows:
DC<T1; and MVV<T2; and MVS<T3; and MVO<T4; and
$a1(DC-T1)^2 + a2(MVV\_T2)^2 + a3(MVS-T3)^2 + a4(MVO-T4)^2 < T5$ Where DC is the value of the DC coefficients for the region; MVV is the motion vector value for the region; MVS is the average difference between the value of the motion vector and the value of the motion vectors of the regions above, below, and to each side of the region; and MVO is the orthogonality of the motion vector for the region with respect to the motion vectors of the regions that border the region; T1-T5 are pre-determined thresholds; and a1-a4 are constants. The constants and thresholds were chosen statistically based on comparisons of results by viewers, to most consistently enhance the resulting image.

Figure 3:
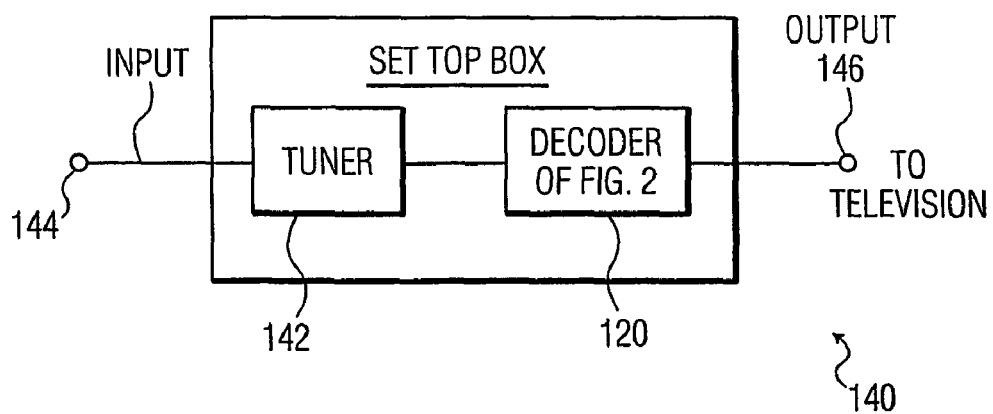
FIG. 3 shows portions of a example set top box using the decoder of FIG. 2.

FIG. 3 shows a set top box 140 of the invention. Tuner 142 selects a video stream for a video program from among multiple streams for several different video programs provided at input 144. The video decoder 120 of FIG. 2 decodes the video program and provides the decoded program to output 146 which can be directed to a video display e.g. a television set.

Figure 4:
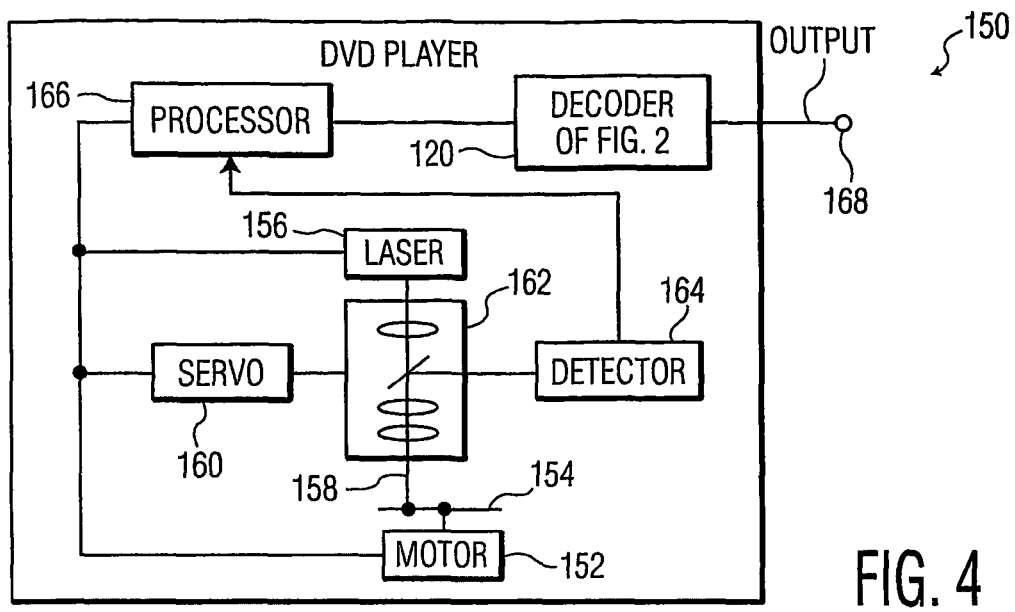
FIG. 4 illustrates portions of an example DVD player using the decoder of FIG. 2.

FIG. 4 illustrates a DVD player 150 of the invention. The video player has a motor 152 for rotating a video disc 154. A laser 156 produces a radiation beam 158. A servo 160 controls the position of an optical system 162 to scan an information layer of the video disc with a focused spot of the radiation beam. The information layer effects the beam and reflects or transmits the beam to a radiation detector 164 for detecting the beam after it has been effected by the information layer. Processor 166 controls the servo and motor and produces a video stream containing encoded information for a group of pictures (GOP) depending on the detection. Then the video decoder of figure decodes the video stream and supplies the decoded video stream to an output 168 for connection to a display.

The processor 166 can be the same processor 128 as in the decoder of FIG. 2 or an additional processor can be provided as shown.

Figure 5:
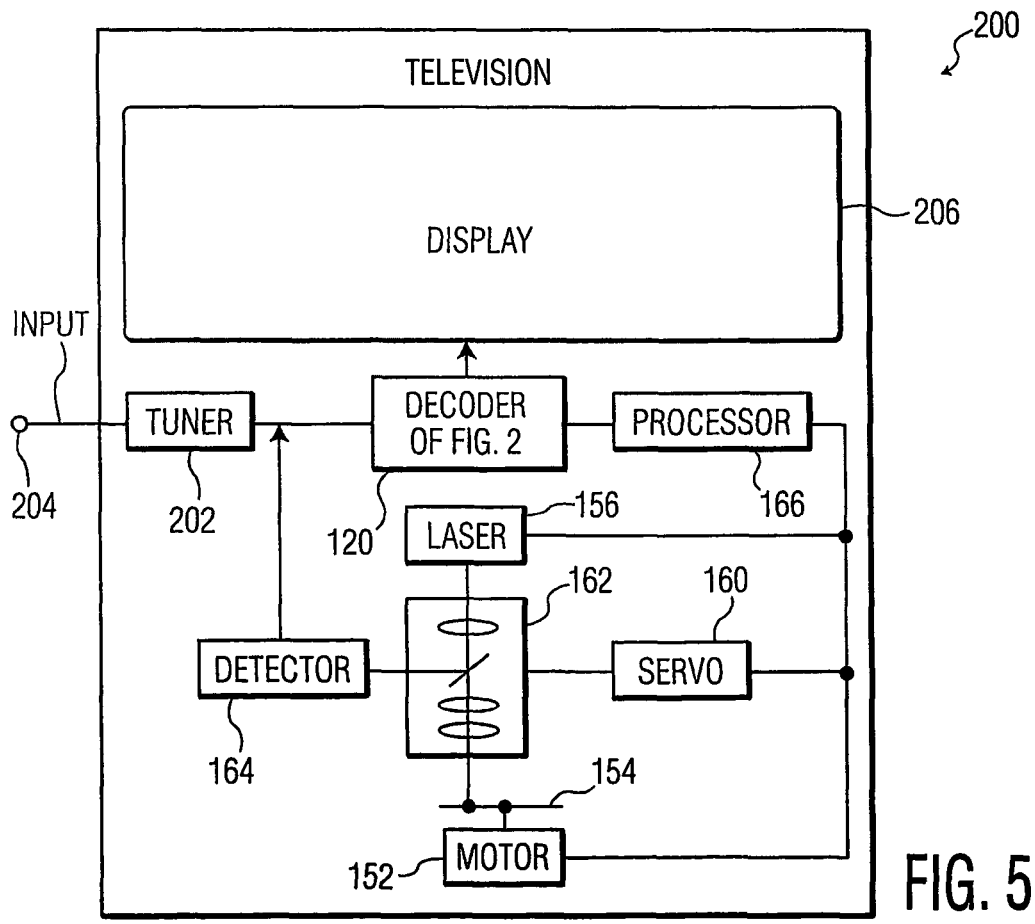
FIG. 5 shows portions of an example television using the decoder of FIG. 2.

FIG. 5 shows a television 200 of the invention. A tuner 142 selects a video stream of a video program to be played from a plurality of video streams for respective video programs provided to input 144. The decoder 120 of FIG. 2 decodes the selected video program and provides it to display 206. The television may have components of the DVD player of FIG. 4 for playing stored video programs (or recording programs) using the DVD components.

The invention has been described above in relation to specific example embodiments. Those skilled in the art will know how to modify these example embodiments within the scope of the invention herein. The scope of the invention is only limited by the following claims.

The invention claimed is:

1. A method, comprising:
   receiving, at a decoder, a video stream containing encoded frame based video information including an encoded first frame and an encoded second frame, the encoding of the second frame depends on the encoding of the first frame, the encoding of the second frame includes motion vectors indicating differences in positions between regions of the second frame and corresponding regions of the first frame, the motion vectors define the correspondence between regions of the second frame and corresponding regions of the first frame; and via the decoder:
decoding the first frame;
determining a re-mapping strategy for video enhancement of the decoded first frame using a region-based analysis;
re-mapping regions of the decoded first frame according to the determined video enhancement re-mapping strategy for the first frame so as to enhance the first frame;
recovering from the video stream, the motion vectors for the second frame;
decoding the second frame; and
re-mapping regions of the second frame that correspond to regions of the first frame using the video enhancing re-mapping strategy for the first frame so as to enhance the second frame.

2. The method of claim 1, wherein:
the first frame is an I-frame and the second frame is a subsequent non-I-frame.

3. The method of claim 2, wherein:
the video stream is an MPEG stream of packets; and the non-I-frame is a P-frame or a B-frame.

4. The method of claim 1, wherein:
the video enhancement re-mapping strategy for the first frame includes re-mapping intensity values to adjust the contrast to enhance the first frame.

5. The method of claim 1, wherein:
the decoding of the second frame is performed using a reconstruction loop; and the video enhancement re-mapping of the second frame is done completely within the reconstruction loop so that motion vectors do not have to be stored.

6. The method of claim 1, further comprising:
selecting one or more regions of the second frame depending on whether a similarity criteria is met for a similarity between the regions of the second frame and corresponding regions of the first frame, the similarity criteria including measures of similarity in addition to correspondence between regions of the first frame and second frame;
wherein the re-mapping of the regions of the second frame based on the video enhancement re-mapping strategy for the first frame is only performed for the selected regions of the second frame.

7. The method of claim 1, further comprising:
recovering, from the video stream, values of DC coefficients for the second frame, the DC coefficient values being the differences between the first frame and the second frame, in the predicted values of image blocks, after motion compensation, motion compensation being the re-mapping of regions depending on the motion vectors during decoding; and
selecting regions of the second frame depending on whether the values of the DC coefficients for the regions meet a similarity criteria;
wherein the re-mapping of the regions of the second frame based on the video enhancement re-mapping strategy for the first frame is only performed for the selected regions of the second frame.

8. The method of claim 7, wherein:
the selection of regions of the second frame for re-mapping based on the video enhancement re-mapping strategy for the first frame, depends on the relation between the values of the DC coefficients for blocks of the region of the second frame and a predetermined or calculated DC coefficient threshold.

9. The method of claim 1, wherein:
the method further comprises selecting regions of the second frame depending on the respective values of motion vectors for the regions; and
the re-mapping of the regions of the second frame based on the video enhancement re-mapping strategy for the first frame is only performed for the selected regions of the second frame.

10. The method of claim 1, wherein:
the method further comprises selecting regions of the second frame depending on whether the regions meet a similarity criteria depending similarity between the properties of the motion vectors for the region and the properties of the motion vectors for neighboring regions of the respective regions; and
the re-mapping of the regions of the second frame based on the video enhancement re-mapping strategy for the first frame is only performed for the selected regions of the second frame.

11. The method of claim 10, wherein:
the properties of the motion vectors on which meeting the similarity criteria depends includes the similarity between the value of the motion vector for a region and the motion vectors for its neighboring regions.

12. The method of claim 10, wherein:
the properties of the motion vectors on which meeting the similarity criteria depends includes the orthogonality between the value of the motion vector for a region and the motion vectors for its neighboring regions.

13. The method of claim 1, wherein:
the first frame is an I-frame and the second frame is a subsequent non-I-frame;
the video stream is an MPEG stream of packets and the non-I-frame is a P-frame or a B-frame; and
the video enhancement re-mapping strategy for the first frame includes re-mapping intensity values to adjust the contrast to enhance the first frame; wherein the method further comprises:
selecting one or more regions of the second frame depending on whether a similarity criteria is met for a similarity between the regions of the second frame and corresponding regions of the first frame and the re-mapping of the regions of the second frame based on the video enhancement re-mapping strategy for the first frame is only performed for the selected regions of the second frame; and
recovering from the video stream, values of DC coefficients for the second frame, the DC coefficient values being the differences between the first frame and the second frame, in the predicted values of image blocks, after motion compensation, motion compensation being the re-mapping of regions depending on the motion vectors during decoding; and the meeting of the similarity criteria depends on the values of the DC coefficients;
wherein the meeting of the similarity criteria depends on comparing the properties of the motion vectors for the regions and neighboring regions of respective regions;
wherein the properties of the motion vectors on which meeting the similarity criteria depends includes the similarity between the value of the motion vector for a region and the motion vectors for its neighboring regions;
wherein the properties of the motion vectors on which meeting the similarity criteria depends includes the orthogonality between the value of the motion vector for a region and the motion vectors for its neighboring regions.

14. A video decoder, comprising:

an input for receiving a video stream containing encoded frame based video information including an encoded first frame and an encoded second frame, the encoding of the second frame depends on the encoding of the first frame, the encoding of the second frame includes motion vectors indicating differences in positions between regions of the second frame and corresponding regions of the first frame, the motion vectors define correspondence between regions of the second frame and corresponding regions of the first frame;

a decoding unit for decoding the frames, wherein the decoding unit recovers the motion vectors for the second frame;

a processing component configured to determine a re-mapping strategy for video enhancement of the decoded first frame using a region-based analysis, re-map the first frame using the re-mapping strategy, and re-map one or more regions of the second frame depending on the re-mapping strategy for corresponding regions of the first frame.

15. The decoder of claim 14 wherein:

the decoder further comprises a buffer, wherein the decoding unit decodes the first frame and stores the first frame in the buffer;

the processing component re-maps the stored first frame according to the video enhancement re-mapping strategy, and transmits the enhanced first frame;

the decoder further comprises a combiner;

the decoding unit decodes the second frame to determine the differences between the first frame and the second frame, and transmits the differences to the combiner;

the processing component again re-maps the intensity values of the first frame depending on the motion vectors of the second frame and transmits the again re-mapped first frame to the combiner; and the combiner combines the again re-mapped first frame with the differences between the first frame and the second frame to produce a decoded second frame that is enhanced.

16. The decoder of claim 14 wherein:

the processing component selects one or more regions of the second frame depending on whether a similarity criteria is met for a similarity between the regions of the second frame and corresponding regions of the first frame; and the processing component re-maps the regions of the second frame based on the video enhancement re-mapping strategy for the first frame only for the selected regions of the second frame.

17. The decoder of claim 14 in which the processing component operates the decoding unit.

18. A set-top-box, comprising:

a tuner for selecting a video stream of a video program to be played from a plurality of video streams for multiple video programs;

the video decoder of claim 14 for decoding the selected video stream;

and an output for providing the decoded program to a video display.

19. A video disc player, comprising:

a motor for rotating the disc;

a laser for producing a radiation beam;

an optical system for scanning an information layer of the video disc with the radiation beam, the information layer effecting the beam;

a servo for positioning the optical system;

a radiation detector for detecting beam after it has been effected by the information layer;

a processor component configured to control the servo and motor and to produce a video stream containing encoded information for a group of pictures (GOP) depending on the detection; and the video decoder of claim 14.

20. A television, comprising:

a tuner for selecting a video stream of a video program to be played from a plurality of video streams for multiple video programs;

the video decoder of claim 14 for decoding the selected video stream; and a video display for displaying the decoded frames of the selected video program.

21. A method comprising:

receiving, at a decoder, a video stream containing encoded information for groups of pictures (GOP), the first picture in a GOP is an I-frame, and a subsequent picture in the GOP is a non-I-frame; and via the decoder:

decoding the I-frame;

determining a re-mapping strategy of intensity values to change the contrast to enhance the decoded I-frame using a region-based intensity analysis;

re-mapping the intensity values of the decoded I-frame according to the determined re-mapping strategy;

recovering from the video stream, motion vectors for the subsequent non-I-frame, the motion vectors are differences in the positions of regions in the I-frame and corresponding regions in the non-I-frame;

decoding the subsequent non-I-frame;

determining whether the similarity between corresponding regions meet a similarity criteria;

selecting one or more regions of the non-I-frame depending on whether similarity criteria is met for a similarity between the regions of the non-I-frame and the corresponding regions of the I-frame; and re-mapping the intensity values of the selected regions of the non-I-frame depending on the re-mapping strategy of the corresponding regions of the I-frame so as to change the contrast to enhance the non-I-frame.

* * * * *